Jan. 22, 1924.
P. B. ANDERSON
TRANSIT
Filed Sept. 19, 1922    2 Sheets-Sheet 1
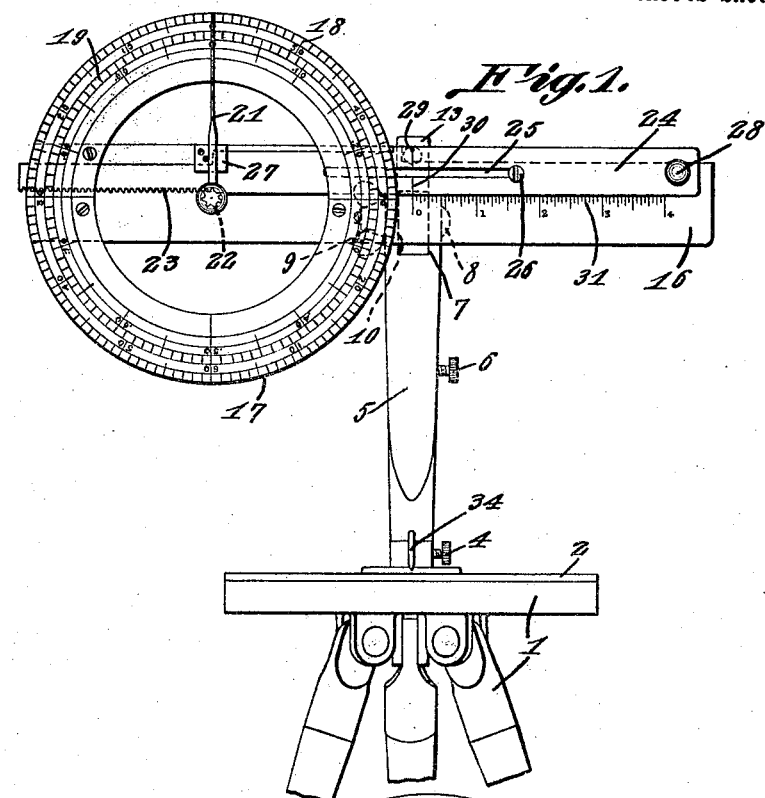
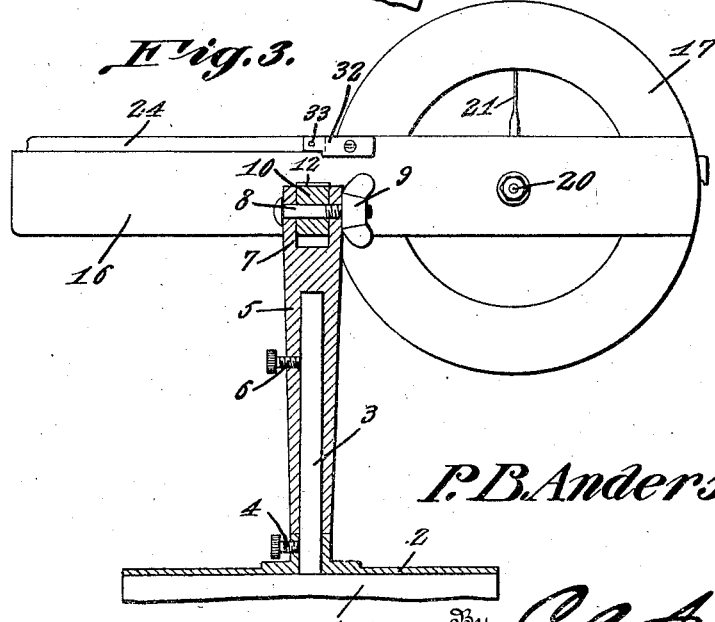
P. B. Anderson, Inventor

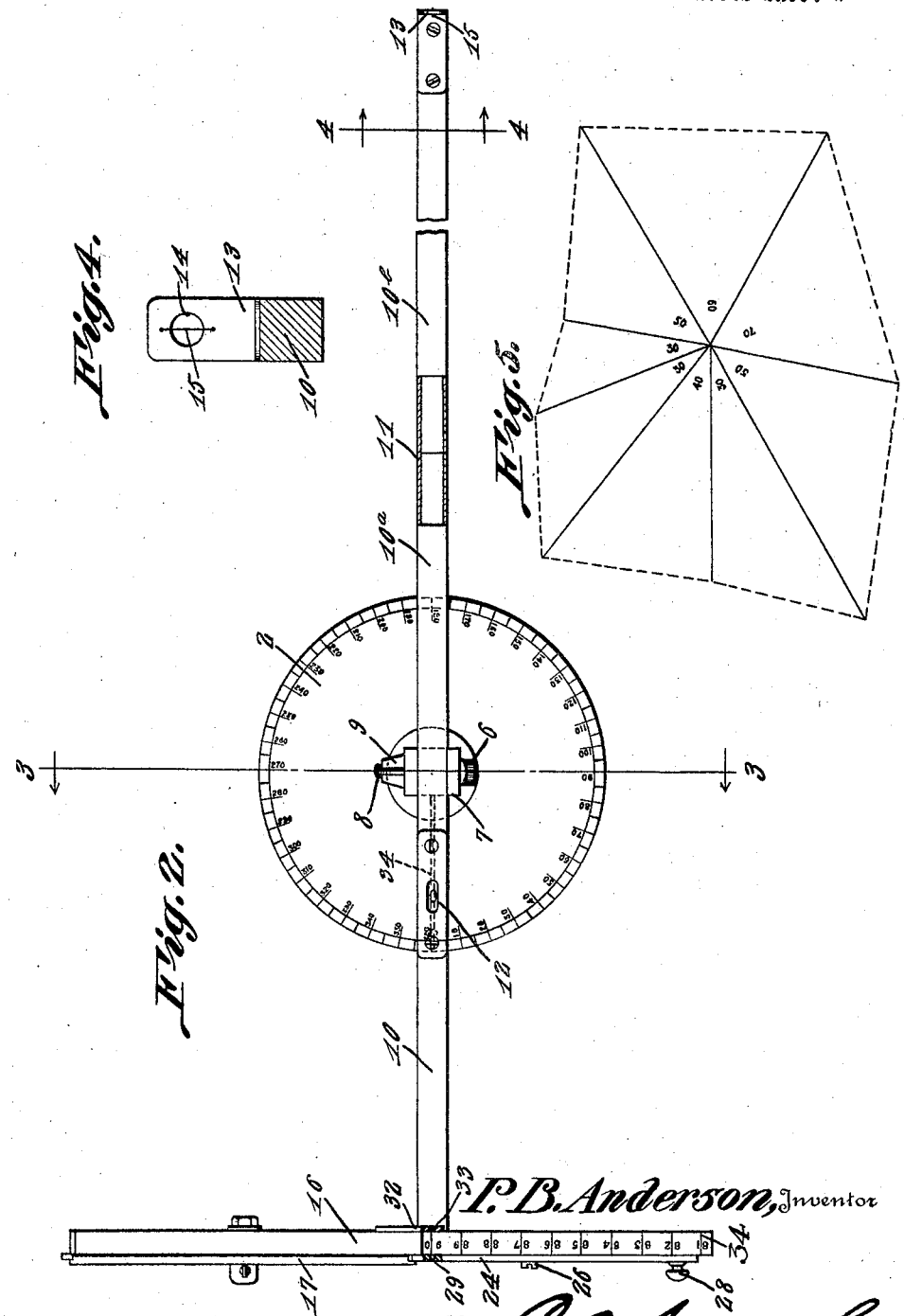

Patented Jan. 22, 1924.

1,481,672

UNITED STATES PATENT OFFICE.

PIERCE BUTLER ANDERSON, OF BROWNSVILLE, TENNESSEE.

TRANSIT.

Application filed September 19, 1922. Serial No. 589,174.

*To all whom is may concern:*

Be it known that I, PIERCE BUTLER ANDERSON, a citizen of the United States, residing at Brownsville, in the county of Haywood and State of Tennessee, have invented a new and useful Transit, of which the following is a specification.

This invention relates to a transit designed primarily as a means for measuring distances, computing areas, etc., one of the objects of the invention being to provide a means whereby computations can be materially simplified, the accuracy of the instrument increased, and the mechanism be so simplified that it can be used readily by following simple instructions.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a front elevation of the instrument.

Figure 2 is a top plan view thereof, parts being shown in section.

Figure 3 is a section on line 3—3, Figure 2.

Figure 4 is an enlarged section on line 4—4, Figure 2.

Figure 5 is a diagram showing the method of computing the area of a polygon.

Referring to the figures by characters of reference 1 designates a portion of a tripod or other support the top of which is provided with a dial 2 graduated to indicate the degrees of a circle. An upstanding centering pin 3 projects through the center of the dial to which it is held by a set screw 4 or any other suitable means. On this pin is mounted a sleeve 5 adapted to be held against rotation on the pin by a set screw 6 or other suitable means. The upper end of this sleeve is preferably forked as shown at 7 and supports a pivot bolt 8 provided with a binding nut 9.

An arm 10 is pivotally mounted on the bolt 8 and within the fork 7, it being understood that, if desired, this arm can be made up of detachably connected sections $10^a$ and $10^b$ connected by a sleeve 11 shown in section in Figure 2. A spirit level 12 may be carried by the arm 10 and one end of the arm may be formed with an upstanding ear 13 having a sight opening 14 therein intersected by a hair 15 as shown particularly in Figure 4.

Connected to the other end of the arm 10 and extending at right angles thereto is a cross arm 16. Secured to the front face of this cross arm is a ring-like dial 17 having concentric series of graduations, the outer series 18 representing minutes while the inner series 19 represents fractions of an inch. A shaft 20 is journaled in the cross arm 16 and is concentric with the dial 17, this shaft being provided with a pointer or index 21 adapted to work along the dial. A small gear 22 is secured to the shaft 20 of the index or pointer and meshes with a rack 23 carried by a slide 24 extending longitudinally of the cross arm 16. A longitudinal slot 25 is formed in the slide and projecting therethrough is a guide screw 26 or the like. A guide member 27 also laps one edge of the slide, preferably directly above the gear 22, so that the slide is thus forced to travel along a straight line when moved relative to the arm 16. A knob 28 may be extended from the slide to facilitate the actuation thereof.

A minute sight opening 29 is formed in the slide and is in line with a graduation 30 carried by the slide and adapted to register with any one of a series of graduations 31 formed along the arm 16. These graduations indicate inches and fractions thereof. Fixedly secured to the arm 16 directly back of the slide 24 and along a straight line parallel with the longitudinal axis of the arm 10, is a plate 32 shown in section in Figure 2 and having a stationary sight opening 33 in line with the center of the hair 15.

The parts are so proportioned that when the sight opening 29 registers with the opening 33 the center of the hair 15 can be sighted. At this time the slide 24 will be at the left limit of its movement and the index or pointer 21 will be at its normal or zero position as shown in Figure 1.

The distance between the hair 15 and the sight opening 29 when in its normal position, is fixed and, in practice the two sights 15 and 29 have been spaced apart 28.636 inches.

When it is desired to determine accurately the distance between two points the instrument is first trained upon one end of a target of known width placed at a distant point. When the instrument is thus first trained the sights 29, 33 and 15 are all in alignment with the one side of the target. Arm 10 is held against movement upon the tripod after which the slide 24 is shifted laterally until the sight opening 29 and the hair sight 15 are brought into line with the other side of the target of known width. The graduation 30 can then be read in connection with the graduations 31 to determine the length of the base of the triangle determined by the arm 10, slide 24, and the sights 15 and 29. With the two known dimensions of one triangle, to wit, the distance 28.636 inches and the indicated distance on the arm 16, and the known distance between the sides of the target, the distance between the instrument and the target can be readily determined by the simple process of the rule of three. In other words if the distance between the two sides of the target is ten feet and the sight 29 has been moved two inches along the arm 16 the distance between the instrument and the target can be expressed thus 2 :28.636 ::10 : (distance). Minute fractions of an inch in the adjustment of the slide 24 will be indicated by the pointer 21 on the inner series of graduations 19. Obviously a very minute indication can be had in this manner.

The horizontal dial 2 used on the tripod is not employed during the operation of determining distances. It is, instead, provided to determine data for calculating areas.

The instrument is correlatively constructed to interchange inches and decimals thereof to degrees, minutes and seconds for measuring distances. Theory and actual facts are that the two sights being 28.636 inches apart the hair sight serves as the center of a circle whose radius is 28.636 inches, and the slide becomes a part of the circumference, therefore every one-half inch on the slide is exactly one degree and the needle on the frontal dial will indicate the minutes and seconds. (Read degrees other side of slide at 34. They go reverse of inches.) Therefore when calculating distances you use the table of "natural sines" used by all surveyors or civil engineers—a plane trigonometrical proposition.

By looking into the different elements of this process it will be perceived that ten feet on target staff becomes the radius of a great circle whose tangent is the distance sought; therefore, whatever the slide and needle registered in degrees, minutes and seconds, you turn to the table of "natural sines" and note the ratio for the tangent to correspond with the instrument registering, and multiply that ratio by ten feet; it will give the same answer as that found by the inch process.

For the purpose of measuring the area of a plot of land, the instrument is first placed anywhere within the boundary of the plot and the measurements are then taken to each corner regardless of the shape of the plot or the number of corners. The survey is started by training the sights on the first corner and then turning the horizontal dial until the indicator 34 thereon points to the zero graduation on the dial 2. This is designated the cardinal point. The horizontal dial 2 is then firmly fixed by means of the set screw 4 so as not to turn relative to the tripod from which the pin 3 extends. The distance to the point cited is then determined as hereinbefore pointed out, this being the first line of the survey. The sights are then trained on the next corner of the polygonal area, always turning to the left, and notation is made of the degree of movement on the horizontal dial. The distance is also determined along this second line. This operation is followed throughout the circumference of the dial 2. When the survey is completed there will be as many triangles as there are corners all diverging from the point where the instrument is located. By calculating each triangle the area of the plot can be determined accurately. In Figure 5 the lines obtained to the corners of a polygonal area have been shown and the angles formed thereby have been designated. This figure merely shows, in diagram, how the operation of computing the area of a polygonal plot is carried out.

The instrument can be used to measure not only distances and areas but also for grading roads and ditches, laying off terraces, obtaining the height of objects and their distances from each other, and for many other purposes.

The cross arm 16 is mounted to swing about its point of connection with the arm 10 so as to adapt the instrument for use in measuring vertically, in grading, etc.

It is of course understood that instead of computing the area of a polygonal plot by following the method herein outlined, a quicker though probably less accurate method can be used. This consists in determining the average of the different radii determined by the survey and then using this average radius as the radius of a circle. By squaring the average radius and multiplying it by 3.1416 the product will be the area of a circle which is of substantially the same area as that of the polygonal plot being computed. This method of computation is advantageous because it requires no mapping and can be done quickly.

Importance is attached to the use of the stationary sights 33 because by the use thereof the operator can, whenever desired, sight through the openings 33 and 14 to determine whether the instrument is properly positioned to take accurate measurements.

What is claimed is:—

1. In an instrument of the class described the combination with an angularly adjustable member and movable sights thereon normally disposed at a known distance apart, of means for indicating the extent of movement of one of the sights when shifted from its normal position, said means including cooperating fixed and movable graduations, a dial, and a pointer operated by the movement of the sights and cooperating with the dial to indicate minute fractions of units of measure.

2. In an instrument of the class described the combination with an arm pivotally mounted between its ends and mounted for rotation about an axis extending perpendicularly to the axis of the pivotal movement of the arm, of a sight fixedly mounted on the arm adjacent each end, said sights being a known distance apart, a cross arm at one end of the sights carrying arm, a slide carried by the cross arm, a sight therein normally in line with the first named sight, means for shifting the slide out of normal position, and means for indicating the extent of movement of the slide, said means including a rack movable with the slide, a gear meshing with the rack, a pointer revoluble with the gear, and a graduated dial cooperating with the pointer.

3. An instrument of the class described including a supporting structure, an upstanding member mounted for rotation relative thereto, an angularly adjustable dial, means on said member and cooperating with the dial for indicating the degrees of rotation of the member relative to the dial, an arm pivotally mounted between its ends upon said member, sights adjacent the ends thereof and a known distance apart, a cross arm, a laterally shiftable sight on the cross arm movable into and out of register with the first named sights but aligning at all times with one of said first mentioned sights, and cooperating fixed and movable means for indicating the extent of movement of the movable sights when shifted relative to the first mentioned sights.

In testimony that I claim the foregoing as my own, I have hereto affixed my signature in the presence of two witnesses.

PIERCE BUTLER ANDERSON.

Witnesses:
    JNO. O. HOMER,
    J. H. BENNETT.